United States Patent [19]

Angstadt et al.

[11] 3,841,826

[45] Oct. 15, 1974

[54] PROCESS AND APPARATUS FOR CONTINUOUSLY ROASTING BEAN-LIKE MATERIALS

[75] Inventors: John W. Angstadt, Williamsville; Kenneth R. Enberg, Tonawanda; Edgar L. Kleindinst, Buffalo; Richard J. Ring, Cheektowaga; David B. Spence, Buffalo, all of N.Y.

[73] Assignee: Blaw-Knox Food and Chemical Equipment, Inc., Buffalo, N.Y.

[22] Filed: Jan. 30, 1974

[21] Appl. No.: 437,984

[52] U.S. Cl............................ 432/2, 432/72, 432/117
[51] Int. Cl............................................. F27b 7/20
[58] Field of Search........................... 432/2, 72, 117

[56] References Cited
UNITED STATES PATENTS

| | | | |
|---|---|---|---|
| 1,470,703 | 10/1923 | Villavicencio | 432/117 |
| 2,081,349 | 5/1937 | Backer et al. | 432/72 |
| 2,952,452 | 9/1960 | Kopf | 432/72 |
| 3,472,498 | 10/1969 | Price et al. | 432/2 |
| 3,627,289 | 12/1971 | Erman | 432/72 |

*Primary Examiner*—John J. Camby
*Attorney, Agent, or Firm*—Marn & Jangarathis

[57] ABSTRACT

There is disclosed a continuous roaster assembly having a two-zoned cooling section with each zone having a gaseous effluent conduit. The effluent conduit from the first cooling zone is in fluid communication with the gaseous effluent conduit from a roasting section of the continuous roaster assembly. A portion of such combined gaseous effluent is incinerated with the remaining portion being recycled to the burner of the roaster assembly.

9 Claims, 1 Drawing Figure

PATENTED OCT 15 1974 3,841,826
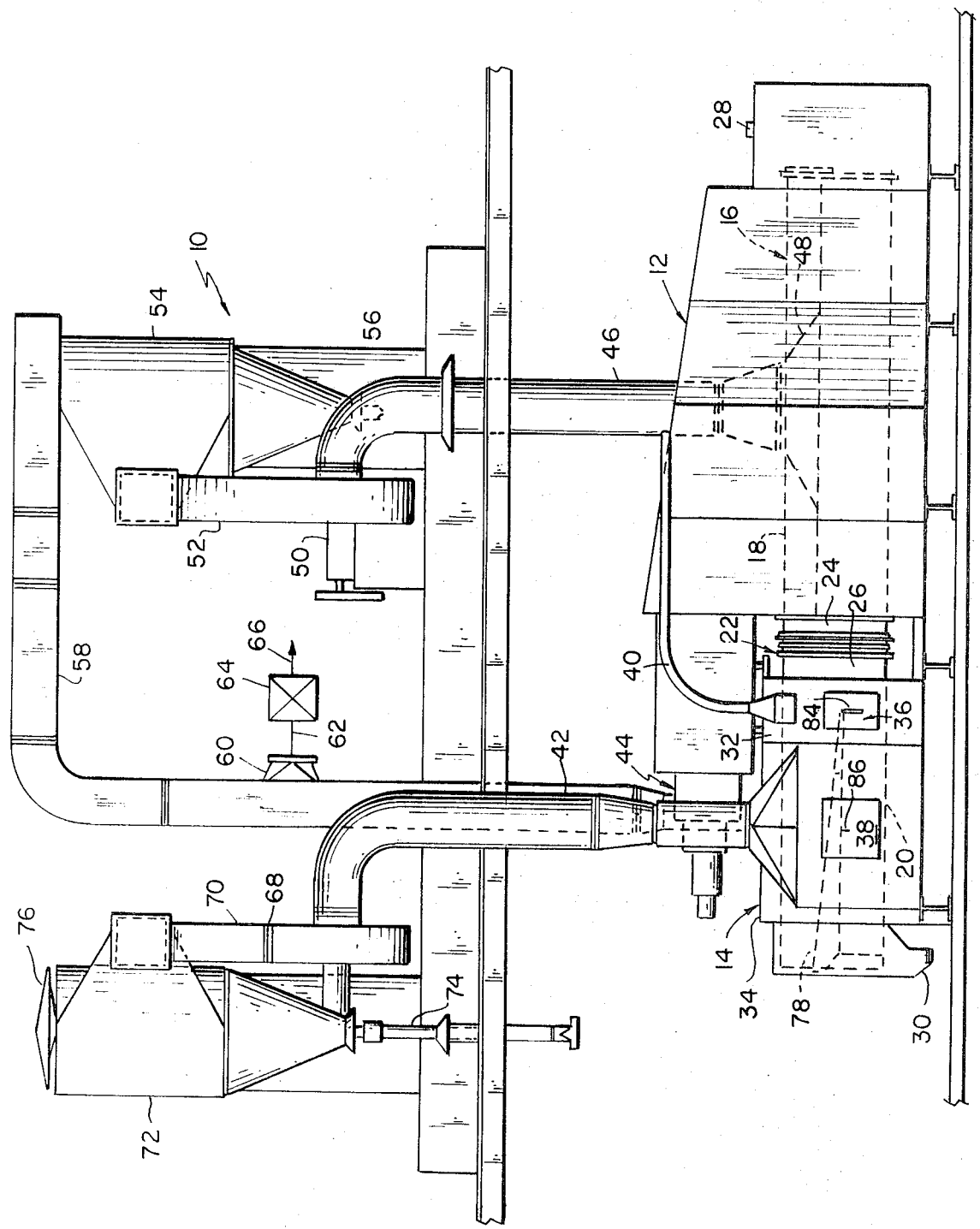

PROCESS AND APPARATUS FOR CONTINUOUSLY ROASTING BEAN-LIKE MATERIALS

This invention relates to the continous roasting of bean-like materials, and more particularly to the continuous roasting of coffee beans. In the interest of clarity, the invention will be described with reference to the continuous roasting of coffee beans, although it will be understood that the invention is applicable to the roasting of cocoa beans, peanuts and other bean-like materials.

BACKGROUND OF THE INVENTION

Generally, the roaster section of the roaster assembly is provided with a burner which combusts a suitable fuel with air and recycled roaster effluent gas to provide a hot gaseous stream at a temperature in the range of 600° to 1,200°F., usually 600° to 800°F. The hot gaseous stream is passed through a perforated rotating chamber or kiln containing the coffee beans. The beans are conveyed uniformly by internal spiral flights. After the beans have reached a predetermined temperature the beans are passed to a cooling section of the roaster assembly wherein spray nozzles meter a controlled volume of water onto the hot beans mainly to stop the roast and add a few percent of moisture. Hot gaseous effluent from the roaster section is withdrawn and partially returned to the burner, such as disclosed in a batch process in U.S. Pat. No. 3,733,172, assigned to the same assignee as the present invention.

During roasting, oils, tars and waxes are evolved together with water vapor which are withdrawn as a hot gaseous effluent at a temperature of about 350° to 385°F. In the cooling section of the roaster assembly, about twice as much air, at ambient temperatures is generally required to cool rapidly the roasted bean to minimize the loss of aromatic oils and preserve the glossy finish on the beans. However, the gaseous effluent from the cooling section has a coffee-odor and contains sufficient particulate matter to be smoky and, therefore, unacceptable by current air pollution requirements. One method proposed to minimize such unacceptable gaseous effluent was to increase the amount of water added in such cooling section, however, such proposal resulted in chaff balls and plug-ups.

OBJECTS OF THE INVENTION

An object of the present invention is to provide a novel process and apparatus for substantially eliminating odors from a continuous roaster for bean-like materials.

Still another object of the present invention is to provide a novel process and apparatus for eliminating coffee odors from a continuous coffee bean roasting assembly.

Another object of the present invention is to provide a novel process and apparatus for substantially eliminating smoke from a continuous roaster for bean-like materials.

A further object of the present invention is to provide a novel process and apparatus for substantially eliminating smoke from a continuous coffee bean roasting assembly.

SUMMARY OF THE INVENTION

These and other objects of the present inventions are achieved in a continuous roaster assembly having a two-zoned cooling section wherein each cooling zone has an effluent conduit. The gaseous effluent from the first cooling zone is in fluid communication via a conduit with the gaseous effluent from the roasting section of the continuous roaster assembly. A portion of the combined gaseous effluent from the roasting section and the first cooling zone is incinerated, with the remaining portion being passed to the burner of the roaster assembly as more fully hereinafter described.

BRIEF DESCRIPTION OF THE DRAWINGS

A better understanding of the present invention as well as other objects and advantages thereof will become apparent upon consideration of the detailed disclosure thereof, especially when taken with the accompanying drawing wherein illustrating an elevational view of a continuous roaster.

DETAILED DESCRIPTION OF THE INVENTION

It is to be understood that equipment, such as valves, indicators, and the like have been omitted from the drawing to facilitate the description thereof, and the placement of such equipment at appropriate locations is deemed to be within the scope of those skilled in the art. Referring now to the drawing, there is illustrated a continuous roaster assembly, generally indicated as 10, comprised of a roaster zone housing and a cooling zone housing, generally indicated as 12 and 14, respectively. A roaster cylinder, generally indicated as 16, is rotatably mounted on suitable bearings (not shown) within the roaster assembly 10 and is comprised of a perforated section 18 disposed within the roaster housing 12, a perforated section 20 disposed within the cooling housing 14 and an intermediate connection section, generally indicated as 22. The intermediate connecting section 22 is formed of solid end portions 24 and 26 of the perforated sections 18 and 20, respectively, of the cylinder 16, suitably connected to one another, such as by bolts (not shown).

The cooling zone housing 14 is comprised of sub-cooling zone housing 32 and 34 having cooling gas opening 38 and gaseous effluent conduits 40 and 42, respectively. A feed inlet 28 is provided on one end of the roaster 10, with a product outlet 30 being provided at the other end thereof.

The roaster housing 12 is provided with a burner assembly, generally indicated as 44, mounted to a side wall thereof for introducing hot gases into the roaster housing 12 produced by burning fuel in the presence of air and recycled hot gases. A hot roaster gas effluent conduit 46 is provided in gaseous communication with the suction side of a fan 50. A discharge conduit 52 is provided for the fan 50 and is connected to a solids collector cyclone 54 having a solids discharge conduit 56. A gaseous effluent conduit 58 including a conduit 60 and an incineration gas outlet 62 is positioned between the outlet of the cyclone 54 and the manifold of the burner 44. The outlet 62 is in fluid communication by line 64 with an afterburner, generally indicated as 64, which is vented to the atmosphere by line 66.

The effluent conduit 42 of the sub-cooling zone 34 is connected to the suction side of a fan 68. A discharge conduit 70 is provided for the fan 68 and is connected to a solids collector cyclone 72 having a solids discharge conduit 74 and a cover 76. A conduit 78 is provided for spray nozzles 84 and 86 disposed in the sub-cooling zones 32 and 34, respectively, for assisting in the cooling of the beans as well as to replace a portion of the water lost by roasting.

In operation, fresh coffee beans are continuously introduced through the feed inlet 28 into the roaster section 12 of the roaster assembly 10 wherein the beans are caused to contact hot gases produced in burner 44 by the burning of fuel in the presence of a combustion supporting medium and recycled gases, as hereinabove discussed. The coffee beans are caused to move at a controlled rate through the roaster section 12 by the rotation of the cylinder 16 and the feed rate of the fresh coffee beans to permit the beans to reach roasting temperature, generally of from 375° to 425°F. The beans are caused to pass into the sub-cooling zone 32 of the roaster assembly 10 wherein the beans are contacted with water by spray 74 to cool the freshly roasted beans to approximately a temperature of about 200° to 250°F. and wherein a substantial portion of the tars, waxes and the like evolve during cooling of the roasted bean.

A hot gaseous effluent at a temperature of between 350° to 400°F. is withdrawn from the roaster section 12 of the roaster assembly 10 and is combined with the gaseous effluent at a temperature of between 225° to 275°F. in line 40 withdrawn from the sub-cooling zone 32 of the roaster assembly 10 for introduction into the cyclone 54 by line 46. A hot gas is withdrawn from the cyclone 54 by conduit 58 with a minor portion thereof being passed by line 62 to the afterburner 64 wherein such portion is incinerated at temperatures between 1,200° to 1,400°F. to thereby substantially reduce smoke and coffee odors produced in the roaster assembly 10 to an acceptable requirement. The beans are withdrawn from outlet conduit 30 after passage through the second sub-cooling section 34.

Accordingly, by incinerating a portion of the hot gases withdrawn from the roaster section 12 and the hot gases withdrawn from the first zone of the cooling section 14, substantially reduces heat requirements of incineration as compared with the incineration of all the gases withdrawn from the cooling section. Heat requirement for the incineration of all the gases from the cooling section is 3 to 4 times that required by practice of the present invention.

Numerous modifications and variations of the invention are possible in light of the above teachings and therefore the invention may be practiced otherwise than as particularly described.

What Is Claimed:

1. In a continuous roaster apparatus for bean-like materials which comprises:
    a. a heating section including burner means;
    b. first conduit means for removing hot gaseous effluent from said heating section and in gaseous communication with said burner means;
    c. a cooling section formed of at least two sub-cooling sections;
    d. a second conduit means for removing a gaseous effluent from a first sub-cooling section and passing said gaseous effluent to said first conduit means;
    e. a third conduit means in fluid communication with said first conduit means downstream of said second conduit means for withdrawing a portion of the gaseous effluent in said first conduit means; and
    f. a second burner means for incinerating said withdrawn portion of gaseous effluent.

2. The apparatus as defined in claim 1 wherein a fourth conduit means is provided to remove a gaseous effluent from a second sub-cooling section.

3. In a process for the continuous roasting of bean-like material which comprises:
    a. introducing said bean-like material in a roasting zone into which hot gases are introduced;
    b. passing said bean-like material after roasting a first cooling zone;
    c. withdrawing and combining a gaseous effluent withdrawn from said roasting zone with a gaseous effluent withdrawn from said first cooling zone;
    d. incinerating a first portion of the combined gaseous effluent step (c); and
    e. burning the second combined gaseous portion of the gaseous effluent together with a fuel to provide said hot gases for said roasting zone.

4. The process as defined in claim 3 wherein said first portion is incinerated at a temperature of from about 1,200° to 1,400° F.

5. The process as defined in claim 4 wherein said first portion is a minor portion of said combined gaseous effluent and said second protion constitutes the remaining portion thereof.

6. The process as defined in claim 3 wherein said bean-like material is withdrawn from said first cooling zone and is passed to a second cooling zone for further cooling therein and from which a cooled bean-like material is withdrawn as product.

7. The process as defined in claim 3 wherein a gaseous effluent is withdrawn said second cooling zone and is vented to the atmosphere after solids removal.

8. The process as defined in claim 3 wherein the combined gaseous effluent is subjected to solids removal prior to the withdrawal of a first portion thereof for incineration.

9. The process as defined in claim 3 herein said bean-like material are coffee beans.

* * * * *